April 17, 1951 R. A. WIESE 2,549,736
APPARATUS FOR FLAME SPRAYING
Filed Feb. 5, 1947 6 Sheets-Sheet 2
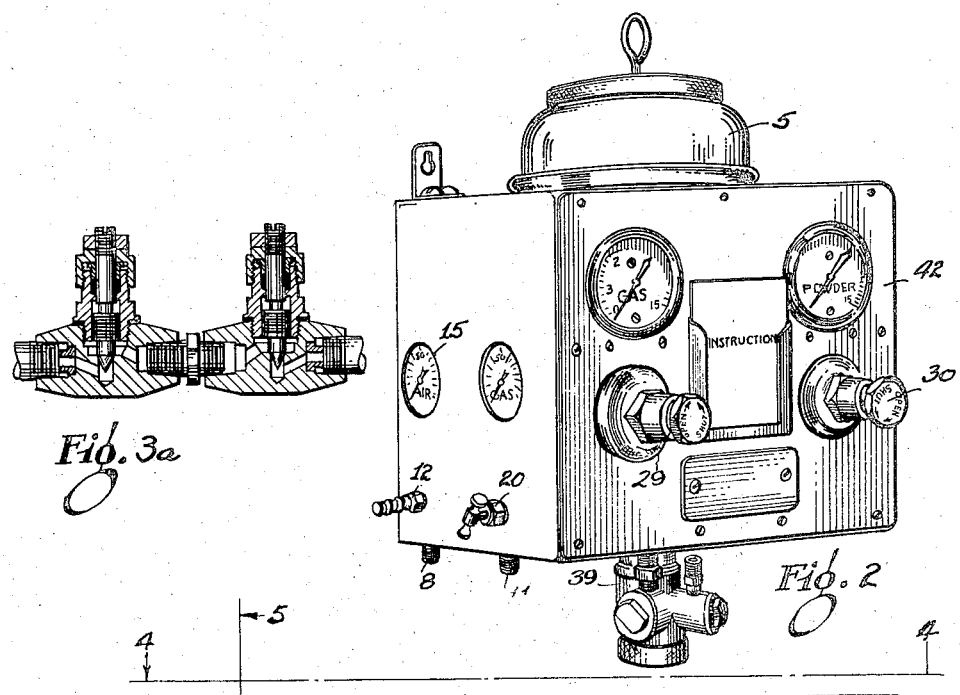
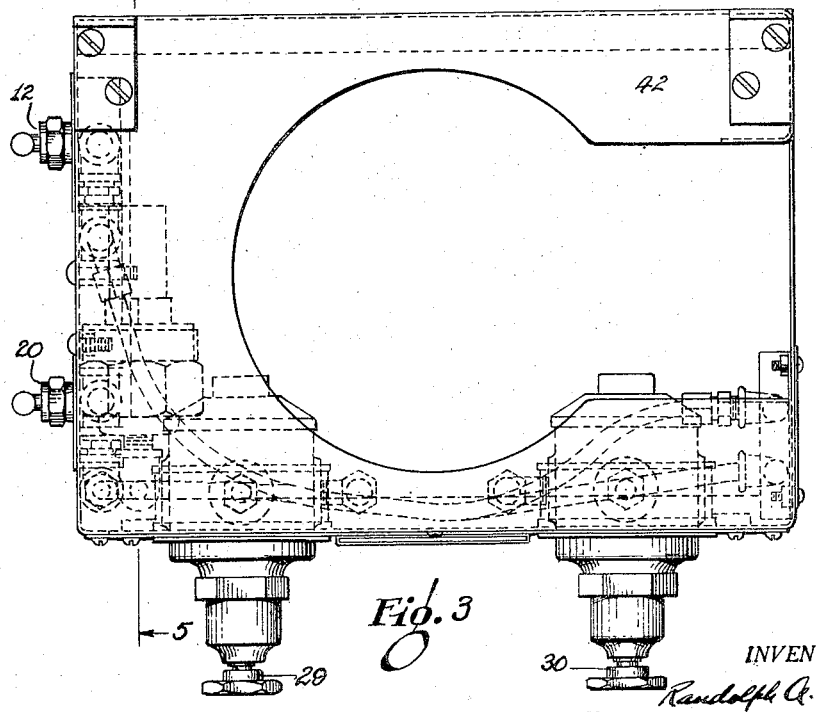
INVENTOR.
Randolph A. Wiese
BY
his ATTORNEYS.

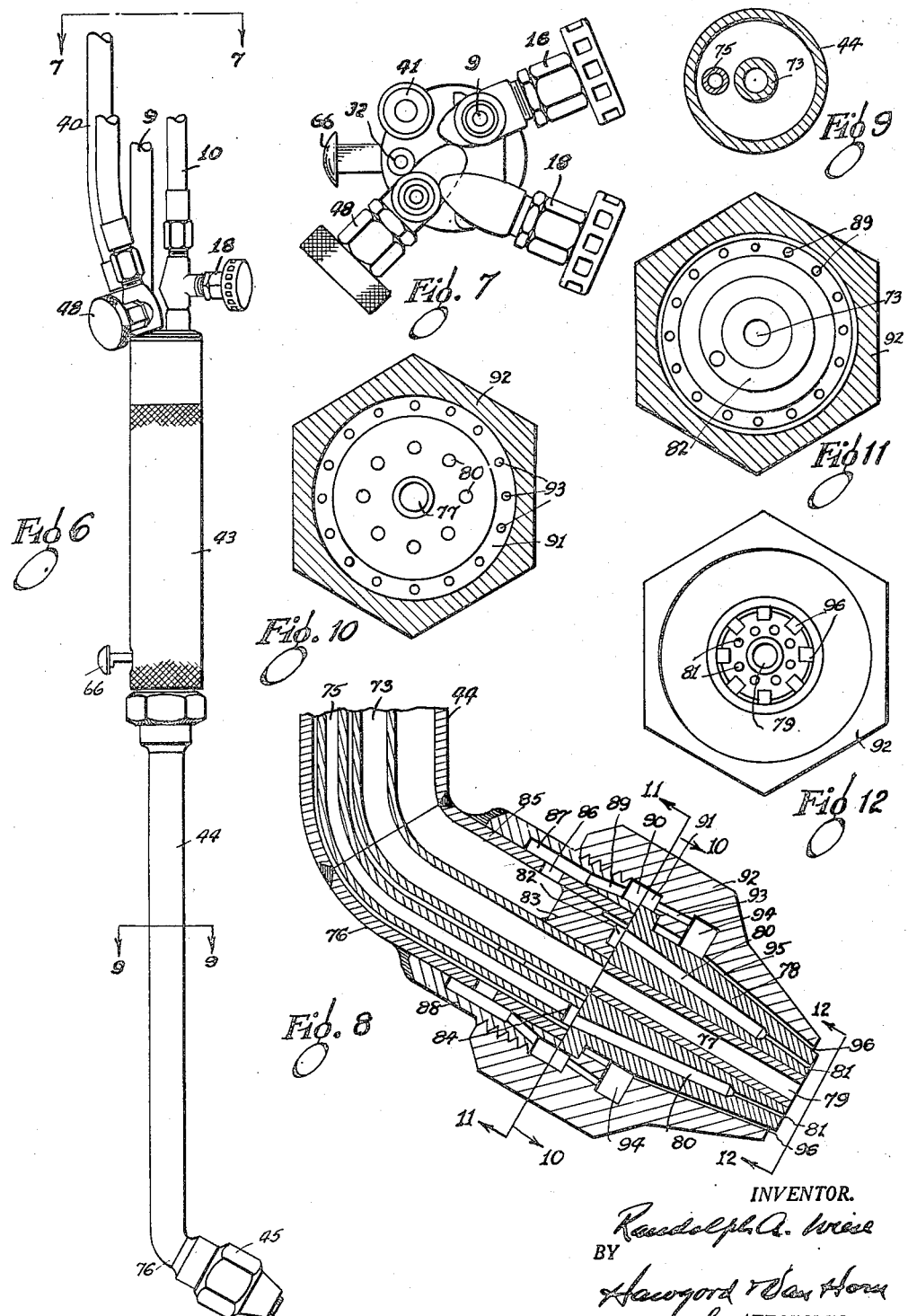

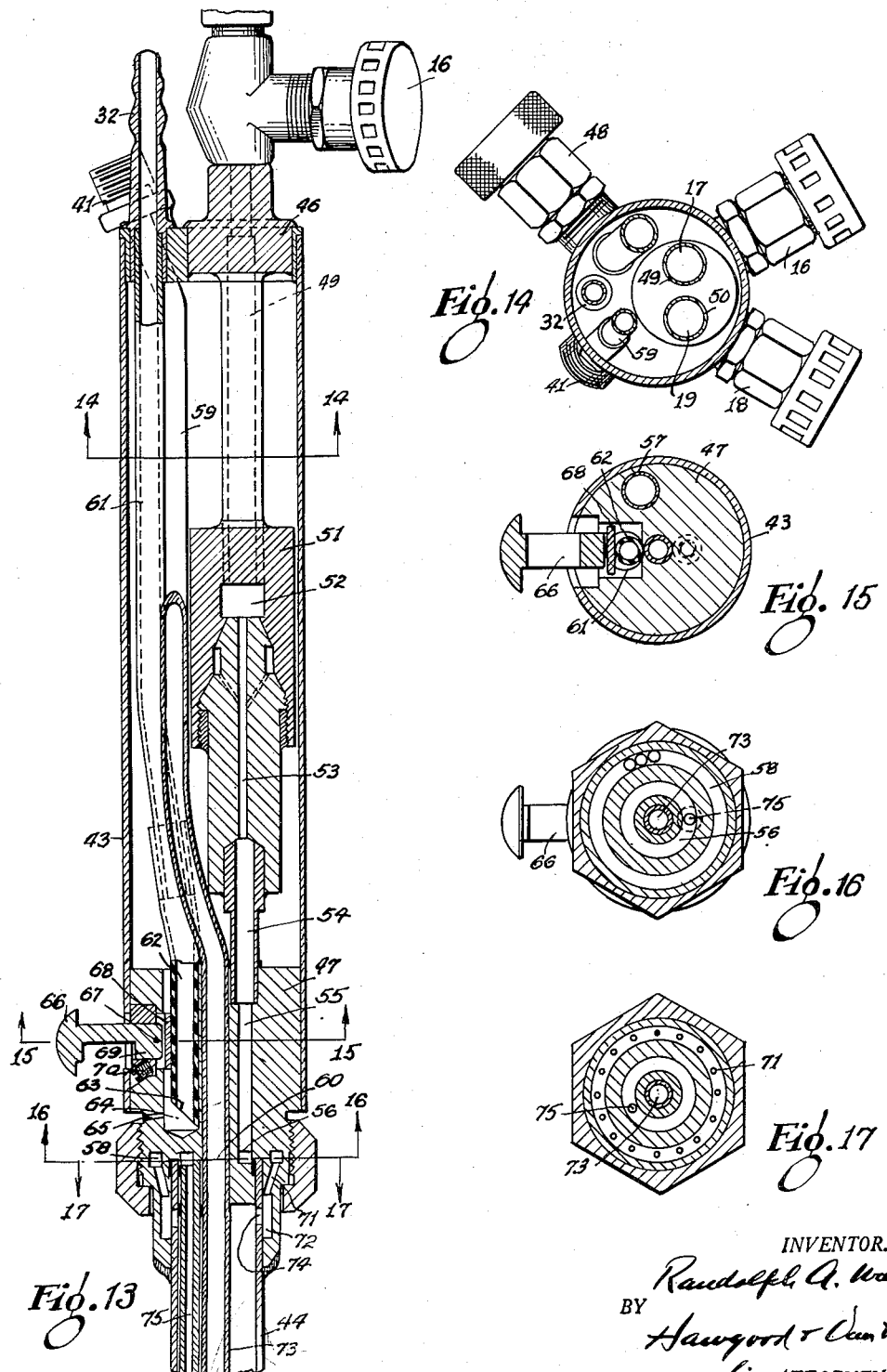

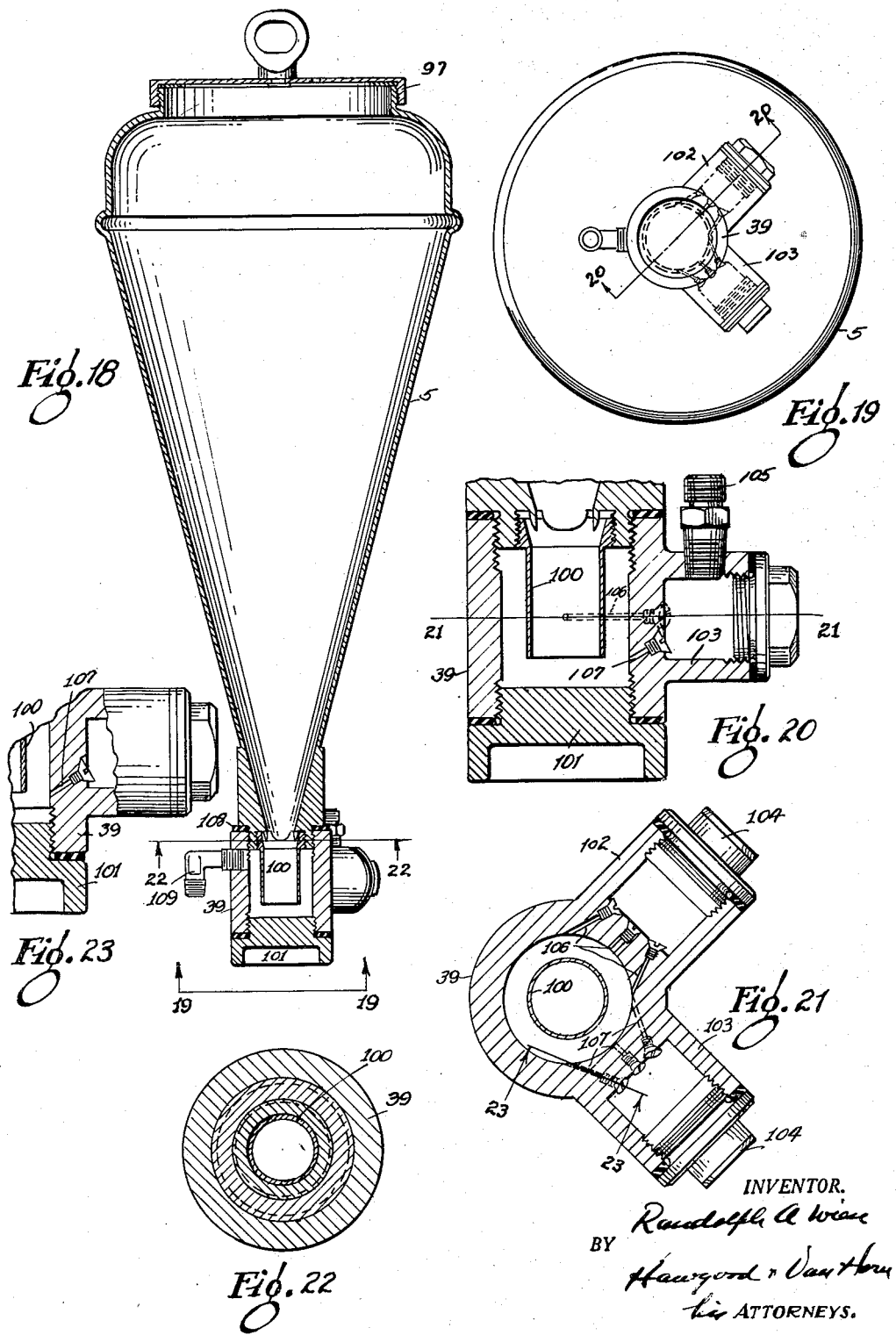

Patented Apr. 17, 1951

2,549,736

UNITED STATES PATENT OFFICE 2,549,736

APPARATUS FOR FLAME SPRAYING

Randolph A. Wiese, New York, N. Y., assignor to The Powder Weld Process Company, New York, N. Y., a partnership composed of Dorothy E. Wiese and Randolph A. Wiese Application February 5, 1947, Serial No. 726,550

6 Claims. (Cl. 91—12.2)

This invention relates to the art of flame spraying powdered or finely divided materials and more particularly to a method or process of flame spraying such materials upon a target either in a wetted condition as in welding or brazing or dry as in coating or layering the same upon the target, and to an improved apparatus and tool for carrying out the method and process.

I have found that tools and apparatus heretofore employed in flame spraying have many disadvantages, are inefficient, and lack the ability of control such as is required to uniformly and satisfactorily carry out operations such as welding, brazing, coating, and cutting. In the previous methods and apparatus with which I am familiar, no adequate provision is made for accurate control of the amount or rate of material to be deposited, of the flame temperature, of the temperature of the target or surface on which the material is to be deposited, or of the temperature of the material being deposited. One of the greatest defects in the use of such apparatus and methods is that the desired results cannot be predetermined, nor duplicated.

It is, therefore, one of the objects of the present invention to provide a method and means for flame spraying materials, either wet or dry, upon a target by which the operator may at all times have complete control over the flow of the materials, the temperatures of the flame, materials and target, and the atmospheres through and into which the materials are projected, thus insuring the predetermined qualities of the deposit or coating and making it possible to duplicate given or previously obtained results.

Another object of the invention resides in the provision of a torch for the above identified purpose, which is provided with means for delivering powdered material to the nozzle of the torch, means for separately delivering a control fluid, a fuel gas and oxygen to the torch, and means for controlling the mixture of these materials prior to contact with the powdered material at the nozzle outlet.

Another object of the invention is to control the temperature of the flame through a substantially wide range, thereby enabling the operator to perform various operations with the torch depending upon the nature of the work to be done, that is, the application of a thin coating, multiple coats, and even wet spraying wherein deposited material is built up on the target in the fluid state, as in welding.

A further object of the invention is the provision of means of the above-named character in which the powdered material is delivered to the nozzle of the target in a constant linear motion as distinguished from a pulsating or intermittent motion, thus enabling a more even application of the material to the target, and particularly so, when said material is to be deposited upon a turning or moving target.

A still further object of the invention is the provision of means in a torch of this type whereby the rate of flow of the gases through the torch may be directly and automatically controlled in proportion to the rate of flow of the powdered material through the nozzle.

A further object of the invention is to provide means for entraining powdered or finely fragmented materials such as metals, metal alloys, metallic oxides, glass forming compositions, chemical compositions of the plastic groups, and mechanical mixes or compositions resulting from mixing these and other suitable materials, in a gas or mixture of gases, in such manner that the flow of the laden gas will be in a constant linear movement free of pulsations or intermittent motion.

A still further object of the invention consists of a process of injecting finely powdered or fragmented materials in a controlled atmosphere flame and onto a surface or target whereby known reproducible results can be obtained.

Another object of the invention is to provide means whereby the materials to be deposited upon a surface can be projected in a constant linear motion at relatively low pressures upon a revolving or moving target, thus insuring a uniform deposit.

A further object consists in a economical method of the above named character by which a welding, brazing, coating, or even flame cutting operation may be performed with predetermined results, by means which is extremely simple of construction, easy to operate and handle, and over which the operator maintains accurate control at all times.

It is another of the objects of this invention to provide means whereby powdered or finely divided materials may be applied through a flame to an object or target under such selective control of the operator that the same means may be utilized for welding and for brazing and spraying to contain various types of coatings.

Another object is the provision of means preferably located on or near the gun or torch by which the operator may at all times have finger tip control of the atmosphere in the flame, between the flame and the target and/or at the target itself. By such flexible and positive control over the temperatures and atmosphere conditions in the flame or at the target or even therebetween, the operator, even though not highly skilled, may control the qualities and characteristics of the work with a high degree of certainty.

Another object of the invention is to provide a torch or gun delivering powdered or finely divided materials to a target through a flame and a controlled atmosphere in the flame, at the target and/or between the flame and the target.

Other objects and advantages of the invention will become more apparent as the following description of an embodiment thereof progresses, reference being made to the accompanying drawings in which like reference characters are employed to designate like parts throughout the same.

In the drawings:

Figure 2 is a perspective view of the instrument panel and box, showing the powdered material container supported therein.

Figure 3 is a top plan view of the panel box with the container removed.

Figure 3a is a vertical section through a pair of needle valves.

Figure 6 is a plan view of a torch embodying my invention.

Figure 7 is a rear end view of the torch in the direction of line 7—7 of Figure 6.

Figure 8 is an enlarged section through the nozzle end of the torch.

Figure 9 is a transverse section taken on line 9—9 of Figure 6.

Figure 10 is a section in the direction of the arrows 10—10 of Figure 8.

Figure 11 is a section taken on line 11—11 of Figure 8.

Figure 12 is a front end view of the nozzle in the direction of line 12—12 of Figure 8.

Figure 13 is a longitudinal section through the handle of the torch.

Figure 14 is a section taken on line 14—14 of Figure 13.

Figure 15 is a section taken on line 15—15 of Figure 13.

Figure 16 is a section taken on line 16—16 of Figure 13.

Figure 17 is a section taken on line 17—17 of Figure 13.

Figure 18 is a front view, partly in section of the powder container and mixing chamber.

Figure 19 is an end view of the same taken in the direction of line 19—19 of Figure 18.

Figure 20 is an enlarged section taken on line 20—20 of Figure 19.

Figure 1:
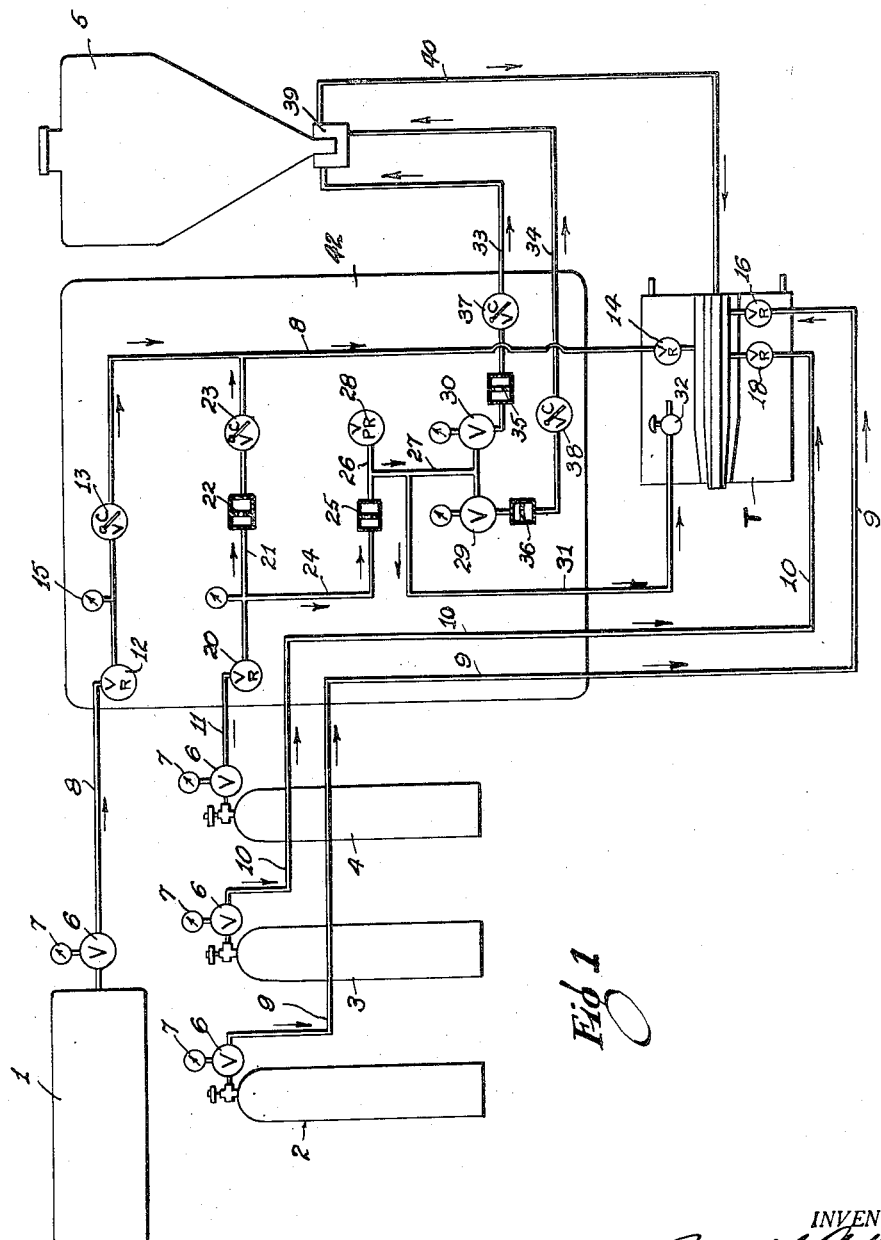
Figure 1 is a diagrammatic view of my invention showing the general layout of the several units and their association in the fluid circuits.
Figure 4:
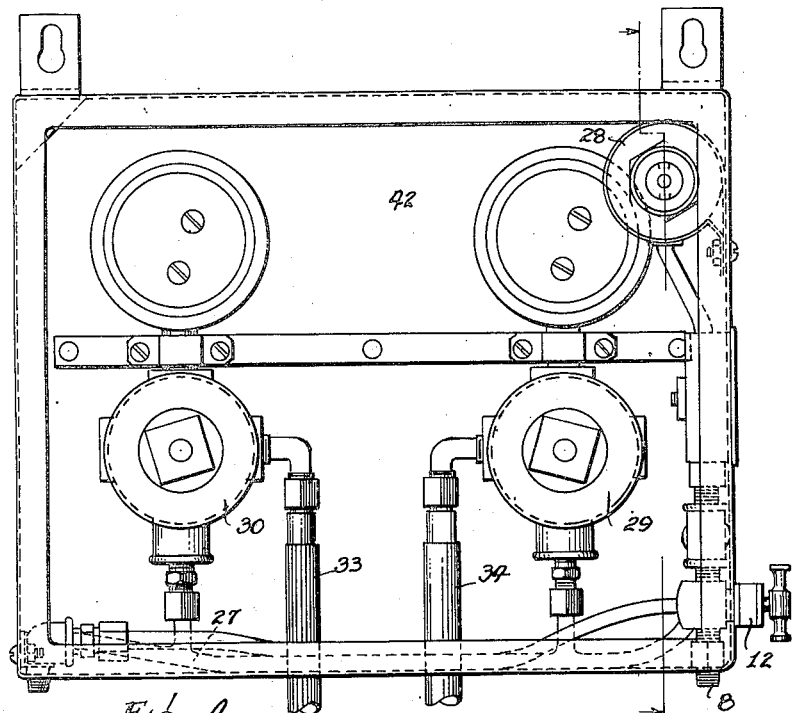
Figure 4 is a rear view of the panel box, taken in the direction of line 4—4 of Figure 3.
Figure 5:
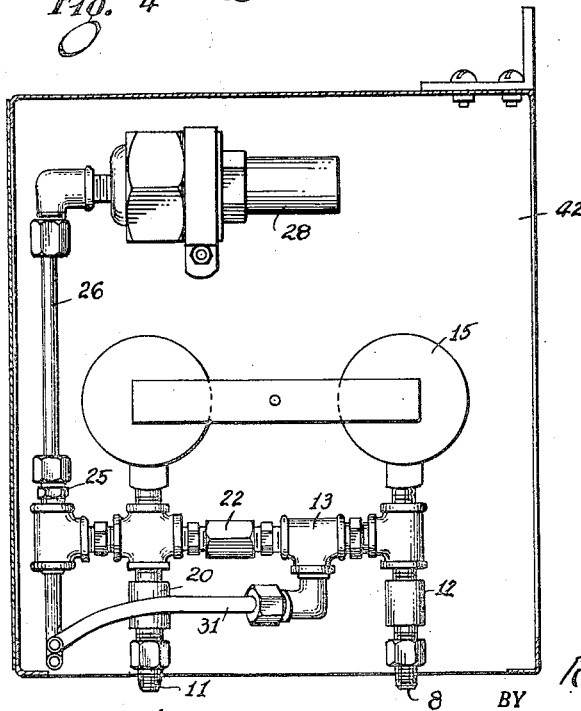
Figure 5 is a vertical section taken in the direction of line 5—5 of Figure 3.

Figure 21 is a section taken on line 21—21 of Figure 20. Figure 22 is a transverse section taken on line 22—22 of Figure 18, and, Figure 23 is a section on line 23—23 of Figure 21.

The present process and apparatus are designed to materially advance the art of flame spraying—from the state of the haphazard spraying of materials and uncertain results; to the stage of the controlled process, and the predictable, reproducible job. In order to reach this stage, it was inevitable that the process would pass from a simple uncontrolled method of metal or other material spraying in its cool or dry state, to an advanced method of projecting finely divided materials of carefully selected characteristics through a controlled temperature flame, within a controlled atmosphere and resulting in a deposit or coating which has certain desired qualities. These qualities may be determined in advance and are always reproducible.

The range of usefulness of my invention is very great. It is limited only by the availability of powdered materials and compositions of materials, which are reasonably stable under the conditions possible to maintain with this system of tools. All kinds and types of powdered or finely fragmented materials may be used to obtain desired results.

Many kinds of results may be obtained from the same materials. For example, a metal composition containing a wetting agent or flux may be sprayed, and results obtained all the way from a dry porous deposit which clings only because the base is rough as in metallizing, on through the various stages of a solder bond, a braze bond, and a true weld of the projected material with the base or target. This infinite variation in result and control is at the complete will of the operator of the equipment.

The result is that the same apparatus may be used to apply light feathery plastic compositions or heavy metallic powders such as lead and the alloys containing carbides and tungsten.

The present invention is based on a diametrically opposed idea to that of previous systems which use powdered materials. It is also radically different from those systems which use materials in wire form. Instead of using compressed air in large volume (40 to 55 C. F. M. at 65 to 85 P. S. I.) to project the materials onto the target, I employ either a processing gas, or a selected mixture of processing gas and air, or compressed air alone, at very small volume and low pressures (0.5 C. F. M. max. at 15 P. S. I. max.) to move the powdered material through the flame zone and onto the target. An auxiliary source of gas, gas and air mixture, or air, is provided for the purpose of surrounding the above gas-material mixture with an envelope of processing gas while the mixture proceeds through the heat zone to the target; and on the target itself. This auxiliary source of processing gas is separately controlled by the operator by means of a separate needle valve in the torch handle as will be explained later. The maximum consumption of this gas-air mixture cannot exceed 30 C. F. M. at 75 P. S. I. The usual position of this valve is closed at all times when welding, brazing, or soldering operations are being performed.

It is only when materials are being sprayed dry deliberately, as in ordinary metallizing, or to provide auxiliary cooling, as when spraying plastics, that this auxiliary source of processing gas is used, and then only to the amount necessary to obtain desired results in the deposit.

In short, my invention is designed to provide, and does provide, all of the factors of control which are now lacking in other systems.

More specifically, referring first to Figure 1, it will be seen that I provide separate sources of compressed air 1, fuel gas 2, oxygen 3, and processing or carrier gas 4, all under pressure, and a source of powdered material in the container 5.

High pressure diaphragm valves 6 and high pressure gauges 7 are connected at the outlets of the several gas storage containers to initially control the volume of the gases passing from the containers into the respective lines 8, 9, 10, and 11.

The compressed air is delivered from the pipe 8 through a needle or reducing valve 12 and a check valve 13 to a second needle valve 14 on the torch T, there being provided a guage 15 between the needle valve 12 and a check valve 13.

The fuel gas, such as acetylene, propane, hydrogen, etc. passes through a pipe 9 directly to the torch through a reducing or needle valve 16 and to the chamber or duct 17 in the handle of the torch.

The supply of oxygen under pressure passes through the line 10 and a needle valve 18 on the torch to the chamber 19 in the torch.

The processing gas such as nitrogen, carbon dioxide, or carbon monoxide is carried under pressure from its storage tank 4 and the high pressure valve through the line 11 to a needle valve 20. From the valve 20 the processing gas line is divided, there being a line 21 leading through a choked orifice 22 and a check valve 23 to join up with the compressed air line 8 effecting a controlled mixing of processing gas and compressed air to the valve 14 by means of the valves 12 and 20. The processing gas is also carried by a pipe 24 through the choked orifice 25 and pipes 26 and 27 to a relief valve 28, and the low pressure diaphragm valves 29 and 30, respectively. A hose 31 also communicates with the line 27 and is connected at 32 to the torch.

Passing from the low pressure valves 29 and 30 the processing gas is caused to pass in two lines 33 and 34 through the respective choked orifices 35 and 36 and the choke valves 37 and 38 to the powder and gas mixing chamber 39 carried by the powder container 5.

Leading from the mixing chamber 39 is a hose 40 for conveying the powder and entraining processing gas to the inlet connection 41 on the torch.

Thus it will be seen that the valves 12 and 20 afford a variable panel control of the compressed air and processing gas on the pressure side, while the valves 29 and 30 afford a variable panel control of the processing gas from its relatively low pressure side to the mixing or entraining chamber 39.

In addition to these controls which are positive and within easy reach on the panel or panel box 42, I have provided other variable control valves for the admission of compressed air and air and processing gas, oxygen and fuel gas to the torch at 14, 18 and 16, respectively. These valves are located on the handle of the torch preferably at the rear thereof as shown in Figures 6, 7, 13 and 14, where the several hose lines are connected with the torch body. In such location these auxiliary valves are convenient to the operator and provide fingertip control of the torch.

The torch comprises essentially three connected units assembled together as a single torch, these being the handle portion 43, the forward tube section 44, and the nozzle 45 as shown assembled in Figure 6.

I will now proceed to describe the construction of the torch as illustrated in Figures 6 to 17 inclusive. Referring first more particularly to Figures 7 and 13 to 17 inclusive, which relate to the handle portion of the torch. The handle portion of the torch includes an outer casing or tube 43 having an end block assembly 46 in its rear end and a forward block assembly 47 in its forward end. The rear block assembly is adapted to support the fittings carrying the valves 16, 18, 48 and the fittings 32 and 41, which as has been explained above are connected respectively to the several hoses carrying the fuel gas, oxygen, processing gas, the hose 31 and the hose carrying the entrained powder. The valves 16 and 18 communicate the fuel gas and oxygen respectively to the tubes 49 and 50 carried in the end block 46 at one end and supported in the mixing chamber block 51 at their opposite ends and opening at this point into a mixing chamber 52 which is connected by means of a duct 53 to a tube 54 mounted in the forward block 47. The block 47 is provided with a duct 55 communicating with the tube 54 for carrying the mixed fuel and oxygen gases to an annular groove 56 formed in the forward face of the block 47.

The line carrying the processing gas through the valve 48 communicates this gas through the torch handle and the duct 57 in the block 47 to an annular groove 58 formed in the forward face of the block 47 and preferably concentric with the groove 56.

The hose 40 carrying the entrained powder is connected to the fitting 41 so that the entrained powder may be fed through the tube 59 which terminates in the forward face of the block 47 as at 60 to carry the entrained powder axially through the torch.

The hose 31 connected to the fitting 32 and carrying processing gas, delivers this gas through the tube 61 to an auxiliary tube of flexible material 62 which opens at its forward end at 63 into a chamber 64 in the block 47, there being a vent 65 communicating this chamber with the outside atmosphere. I have provided means operating in the block 47 for closing the flexible portion of the tube 62 by pinching the same in order to stop the flow of processing gas through this tube when desired. For this purpose, I provide a fingertip valve or operating member 66 which is pivoted at 67 to a shoe 68 lying along the upper surface of the flexible tube 62. The operating member 66 is provided with a boss 69 which is engageable with a screw 70 projecting into the opening in which the operating member 66 operates. In order to close the tube 62 to shut off the flow of processing gas to the chamber 64, the operator merely depresses the member 66 and rotates it in a counter-clockwise direction in Figure 13 to engage the boss 69 with the screw 70 thereby holding the member 66 and the shoe 68 in its lowermost position until the operator releases the same by slightly depressing the member 66 and rotating it in a clockwise direction to release the pressure on the shoe 68 and the tube 62.

It will be noted that the chamber 64 is also in communication with the interior of the torch handle 43 and is thus in communication with the hose line connecting processing gas through the valve 48 by way of the interior of the torch handle for purposes which will be described more fully hereinafter.

The annular groove or passageway 58 in the end of torch handle communicates through a plurality of angularly disposed ducts 71 with an annular chamber 72. The annular groove or passageway 56 communicates with an end of a tube 73 carried in the forward tubular portion of the torch.

Proceeding now to the forward tubular portion 44 of the torch, the same comprises an outer tubular shell 44, its rear end portion fitting into the forward end of the torch handle as shown more particularly in Figure 13 so that the axial tubular conduit 73 abuts against the forward end of the tube 59 at 60 to form a continuous passageway for the entrained powdered material. The tube 44 is provided with openings 74 communicating the interior of the tube 44 with the chamber 72 and thus providing a passageway for the processing gas from the handle portion of the torch through the tubular body 44. The mixed fuel gas and oxygen entering the annular passage 56 is communicated through a tube 75 which is directly connected with this passageway as shown in this figure.

The forward end of the tubular portion of the torch at 44 is preferably disposed at a convenient angle as at 76 and terminates in a nozzle which is illustrated in cross section in Figure 8 in assembled position on the torch. The axial tube 73 carrying the entrained powdered material is in axial alignment with the passage 77 of the nozzle tip 78 thus feeding the powdered material axially outwardly of the nozzle at 79. The nozzle is also provided with an annular series of passages 80 converging toward the outer tip of the nozzle and terminating in the fuel gas openings 81. The passages 80 terminate at their inner ends in communication with an annular groove 82 formed in the forward face of the block 83, which in turn communicates with the tube 75 as at 84, carrying the fuel gas and oxygen mixture.

The outer shell 85 of the nozzle end of the tube 44 is provided with a series of openings 86 opening radially into a chamber 87 annularly disposed within the hub 88 carried by the tube end 76. The annular chamber 87 is connected by means of a plurality of passages 89 with an annular opening 90 which is in direct communication with the annular opening 91 formed in the nozzle nut 92. A series of ducts 93 communicate between the chamber 91 and chamber 94 formed in the nozzle nut, the latter chamber having communication through the groove 95 with the outlet for the processing gas as at 96.

From the above it will be seen that the entrained powdered material is delivered through the nozzle at 79 by means of the axial opening, the fuel gas is distributed and is discharged in a series of jets defined by the openings 81 around the axis of flow of the powdered material, while the processing or cooling gas emerges through the openings 96 forming an outer envelope for the fuel gas and the powdered material emerging from the nozzle.

In further carrying out my invention, and referring more particularly to Figures 18 to 23 inclusive, I provide a container 5 for the powdered material having a removable closure 97 at the top and whereby the powdered material may be inserted into the container. The container side walls converge downwardly as illustrated in the drawing and terminate in an end member 98, screw threaded at 99 both internally and externally to removably receive on the external threads the powder entraining chamber 39 and also for receiving along the internal threads a metering tube 100.

The metering tube communicates wih the reduced outlet end of the container 5 and serves to meter the flow of the powdered material downwardly into the chamber 39. A removable cleaning plug 101 is threaded into the bottom of the chamber 39 and its inner surface lies just below the outlet end of the metering tube 100 forming a platform in the bottom of the chamber upon which a quantity of the powdered material is deposited. Formed on the entraining chamber are a pair of cylinders 102 and 103 each having cleanout plugs 104. The cylinder 103 is provided with an intake fitting 105 which is connected to the low pressure hose 34 for feeding processing gas to this cylinder. The cylinder 102 is likewise connected by means of a fitting to the hose 33 also feeding low pressure processing gas to this cylinder.

Each of the cylinders 102 and 103 has communication with the interior of the entraining chamber through a plurality of choked orifices indicated at 106 and 107 respectively. One set of choked orifices such as those leading from the cylinder 102 to the interior of the chamber 39 are preferably arranged in a divergent direction and in a substantially horizontal plane so that the processing gas entering the cylinder 102 is projected substantially horizontally radially and substantially tangentially into the chamber 39. The choked orifices 107 are arranged in a divergent direction toward the chamber 39 and are also inclined downwardly as indicated in Figures 20, 21 and 23, that is, in a direction toward the inner face of the plug 101 on which the powder is deposited.

The powder container 5, the entraining chamber 39 and the cylinders 102 and 103 must be assembled together so that there will be no leaks to the outside atmosphere. This is accomplished by gaskets interposed between the plugs 101 and 104 and the parts to which they are removably secured. Likewise a sealing gasket 108 is provided between the end fitting 98 and the chamber 39 when the latter is assembled thereon. An L-type fitting 109 is connected to the interior of the entraining chamber 39 and is also connected with the hose 40 for carrying the powdered material entrained in the processing gas from the chamber 39 to the torch.

It will be noted that, due to the arrangement of the choked orifices, even at low pressure the deposit of powdered material in the bottom of the chamber 39 will be agitated, as will be the incoming processing gas, and that as a result of such concurrent agitation particles will be entrained in the gas and will be discharged through the fitting 109 and the hose 40 directly to the torch in the form of a constant linear stream free of intermittent or pulsating motion.

In practice, my invention may be operated as follows.

The powdered material container 5 is supplied with a quantity of the material which it is desired to deposit or use and the cover is tightly secured in place.

The needle valve 12 on the high pressure side of the control unit as indicated in Figure 2 is then opened to supply compressed air to the line 8 leading to the torch. Then the needle valve 14 on the torch handle is opened and with these two valves open wide the air pressure may be adjusted by operating the diaphragm or valve so that the air gage on the control unit reads approximately 70 lbs.

With these valves still open and compressed air flowing through the torch, the needle valve 20 on the high pressure side of the control unit is opened. The gas diaphragm valve may then be adjusted to read approximatey 75 lbs. The needle valve 14 on the torch may then be closed and the powder container and the entraining chamber will now be under pressure and are in operation. At this stage, the low pressure power control valves should be off and the button valve on the torch should be in the released or "up" position. Processing gas is now being released by the relief valve in the inside of a control unit at a rate of approximately 0.5 C. F. M. To conserve the consumption of this gas, the needle valve 20 should now be closed, the "gas" gage reading will immediately drop to 70 lbs. or equal to the "air" gage reading. As no air is being used with the valve 14 on the torch closed, the entire system may be shut off for periods of time or even overnight or while changing powder in the container 5. This one needle valve 20 on the high pressure side of the control unit is the key to low cost operation. It may be turned on just before starting to operate and turned off immediately when finished, or when the equipment is going to be idle for any length of time.

Holding the torch in one hand with the finger-tip valve 66 released or in up position, the high pressure gas valve 20 is opened and the powder flow is slowly turned on by means of the valves 29 and 30. These valves may be so calibrated that they will both work on the same volume of processing gas. They serve to both control the amount of powder being used and the amount of gas being mixed with the powder in the chamber 39. Opening one will take pressure away from the other.

It is desirable to open valve 29 first since this valve will produce the gas necessary to carry the powdered material through the hose and torch. The valve 30 will add more powder to a selected amount of carrying gas as it is opened. It is the manipulation of these two valves 29 and 30 back and forth that will produce the desired flow of any type of powdered material. I have found that the valve 29 may be relied upon to alone handle the powdered composition although the valve 30 may be used to increase the flow of powder.

When the proper powder flow is obtained, the valve 66 on the torch may be released and the gas valve on the control unit may be shut off.

The several needle valves on the torch handle may be opened, the fuel gas and oxygen supply regulated to produce the amount and mixture of gases wanted and the torch may be lighted in the usual way. The flame may be then adjusted to any type desired. A neutral flame is generally used, but some materials should be projected through a reducing or excess gas flame while others demand an oxidizing or excess oxygen flame. This control is obtained by the use of the needle valves on the torch handle.

With the torch lighted and the desired type of flame adjusted, the valve 20 on the high pressure side of the gas line is turned on. The valve 66 on the torch is pressed down and the powder flow is adjusted as above explained. Under these conditions the torch may be used to weld, braze or solder and control of the powder flow is positive, that is, either "on" or "off" depending upon the position of the valve 66. The amount of powder supplied to the torch is determined by changing the fittings on the low pressure valves 29 and 30.

To add more force to the projection of the material through the flame, the needle valve 14 on the torch handle is turned on, by manipulation of this needle valve control, the operator is able to control closely the character of the deposit on the target. A wide range of results are possible, from a very hot weld to a very cold spray of unmelted particles.

I claim:

1. A flame spraying system comprising a source of fuel gas, a source of carrier gas, a source of fragmented material to be entrained in said carrier gas and then flame sprayed upon a target, a flame spraying tool, conduits connecting each of said sources with said tool, reducing valves in each of said conduits, said conduit leading from the carrier gas source comprising a portion connected to a material entraining chamber, a material entraining chamber communicating with said material source, a pressure reducing valve in said conduit portion, a conduit leading from said entraining chamber for delivering the entrained material and carrier gas to said tool, a valve on said tool for regulating the flow of fuel gas through said tool, said chamber having a plurality of ducts in a wall thereof terminating in orifices opening into said chamber, said ducts diverging toward the interior of said chamber and having connection with said carrier gas source, a metering tube communicating with said fragmented material source and extending into said chamber for delivering said material to said chamber, said ducts being directed across said metering tube at a point adjacent the delivery end thereof whereby to disturb material particles near the edge of a pile of material delivered to said chamber by said metering device.

2. A flame spraying system comprising a source of fuel gas, a source of carrier gas, a source of fragmented material to be entrained in said carrier gas and then flame sprayed upon a target, a flame spraying tool, conduits connecting each of said sources with said tool, reducing valves in each of said conduits, said conduit leading from the carrier gas source comprising a portion connected to a material entraining chamber, a material entraining chamber communicating with said material source, a pressure reducing valve in said conduit portion, a conduit leading from said entraining chamber for delivering the entrained material and carrier gas to said tool, a valve on said tool for regulating the flow of fuel gas through said tool, said chamber having a plurality of ducts in a wall thereof terminating in orifices opening into said chamber, said ducts diverging toward the interior of said chamber and having connection with said carrier gas source, a metering tube communicating with said fragmented material source and extending into said chamber for delivering said material to said chamber, said ducts being directed across said metering tube at a point adjacent the delivery end thereof whereby to disturb material particles near the edge of a pile of material delivered to said chamber by said metering device, and a second set of ducts in said chamber wall terminating in orifices opening into said chamber, said last named ducts directed across the metering tube at a point above said first named ducts whereby to assist the particles disturbed by carrier gas directed from said first orifices named toward the outlet of said chamber.

3. A flame spraying system as in claim 2 in which the last named ducts diverge in a direction toward the axis of said tube and substantially horizontally thereof.

4. A flame spraying system as in claim 2 in which said first mentioned ducts are inclined downwardly and across the lower edge of said metering tube, said last mentioned ducts being directed substantially horizontally of said tube.

5. A flame spraying system as in claim 2 in which the orifices of the first and last mentioned ducts respectively are of different diameters.

6. A flame spraying system as in claim 2 in which the first and last mentioned ducts respectively are disposed angularly circumferentially of said chamber.

RANDOLPH A. WIESE.

REFERENCES CITED

The following references are of record in the file of this patent:

UNITED STATES PATENTS

| Number | Name | Date |
| --- | --- | --- |
| 1,617,166 | Schoop | Feb. 8, 1927 |
| 2,108,998 | Schori | Feb. 22, 1938 |
| 2,137,442 | Callan | Nov. 22, 1938 |
| 2,233,304 | Bleakley | Feb. 25, 1941 |
| 2,356,016 | Strubler | Aug. 15, 1944 |
| 2,427,448 | Duccini | Sept. 16, 1947 |